Patented June 28, 1932

1,864,942

UNITED STATES PATENT OFFICE

WIRT D. RIAL, OF WATSON, CALIFORNIA, ASSIGNOR, BY MESNE ASSIGNMENTS, TO RICHFIELD OIL COMPANY OF CALIFORNIA, OF LOS ANGELES, CALIFORNIA, A CORPORATION OF DELAWARE

COLOR COAT FOR CEMENTED SURFACES

No Drawing. Application filed July 5, 1928. Serial No. 290,708.

This invention relates to a color-coat for cemented surfaces, such as concrete roads with a cement surface, to render the same waterproof and at the same time to color the surface a darker color, which may range from dark brown to black, so that a smaller amount of light will be reflected therefrom.

By well-known methods, color-coats for cement road surfaces are now made by dissolving bituminous products such as coal tar products, asphalt, or asphalt base residual oils in a solvent, which may be a petroleum oil distillate, gasoline, kerosene, benzol, and like solvents. This color-coat is applied to cement road surfaces in the form of a spray with a spray gun, or the color-coat may be applied to the cement surface with a brush or by other methods known in the art. By these well-known methods, large quantities of expensive solvent oil are required to give a sufficiently fluid product and one that will penetrate into the pores of a cement surface to insure a permanent coating or color.

The solvent employed to obtain this fluid product after application to the cemented surface, is lost by evaporation, leaving the higher boiling bituminous or asphaltic product on and in the pores of the cement or concrete to a depth sufficient to insure a permanent dark color.

I have discovered that the use of valuable solvent oils and the loss by evaporation thereof, may be avoided by the employment of a new and less costly color-coat produced by neutralization and emulsification with water of the acid sludge obtained from the acid treatment of asphalt base lubricating oil stocks with sulphuric acid, of which the following is an example.

One part of acid sludge derived from the treatment of an asphalt base lubricating oil stock is commingled with approximately an equal weight of water or more, at a temperature of approximately 212 degrees F. after which a water solution of caustic soda, caustic potash, or other alkali base is added and commingled with the water mixture of acid sludge in quantities sufficient to substantially neutralize approximately one half of all the acid bodies present in the mixture, after which the partly neutralized mixture is permitted to rest in quiet until the partly neutralized sludge has separated from the water solution of sulphate salts. The water solution of sulphate salts which separates is decanted from the partly neutralized sludge, after which the separated partly neutralized sludge is commingled with a further addition of a water solution of caustic soda or other water soluble base, in quantities sufficient to completely neutralize all acids present, using a slight excess of the neutralizing agent, after which a small quantity of sulphuric acid is added in quantities just sufficient to render the mixture slightly acid, which causes the neutralized acid sludge to separate from the water solution of sulphate salts which are then separated by withdrawal therefrom.

This operation of neutralizing acid sludge and separation of the soluble sulphate salts formed thereby, may be carried out in any number of steps of partly neutralizing the acid sludge with a water solution of an alkali base and intermittent withdrawals of the water solution of soluble sulphates therefrom, or the acid sludge may be first completely neutralized and then acidified with sulphuric acid followed by the withdrawal of the water solution of soluble sulphate salts, and is an essential step in this invention to obtain a neutralized acid sludge free from mineral acid and salts. The presence of mineral acid salts in a neutralized acid sludge derived from an asphalt base lubricating oil stock is detrimental and interferes with the employment of the neutralized acid sludge as an emsulsifying agent for the production of a color-coat for cemented surfaces.

After separation of the neutralized acid sludge substantially free from soluble mineral acid salts, a water solution of caustic soda is commingled and emulsified with the neutralized acid sludge in quantities sufficient to render the same alkaline, using approximately 10 cc. of 5° Bé. caustic soda for each pound of neutralized sludge, whereby a fluid permanent emulsion is formed with the caustic soda and one which may be further emulsified with water to any degree of fluidity desired.

For a color-coat suitable for cement roads, it was found that 21 pounds of this neutralized sulpho acid sludge emulsified with water sufficient to make 42 gallons, was satisfactory, although greater or smaller amounts of water may be employed in making the emulsion, depending upon the character of the cement or concrete surface and the depth of color desired.

While the process herein described is well adapted for carrying out the object of the invention, it is to be understood that various modifications and changes may be made without departing from the spirit of the invention and the invention includes all such modifications and changes as come within the scope of the appended claims.

What I claim is:

1. A process of forming a color coat to color and render cemented surfaces waterproof, comprising, commingling water with an acid sludge derived from an acid treatment of an asphalt base lubricating oil stock with sulphuric acid, adding and mixing a water solution of an alkali base with the mixture of water and acid sludge in quantities sufficient to neutralize a portion of the acid constituents present, removing the resulting water solution of sulphate salts, then adding and mixing a further quantity of the water solution of the alkali base with the partly neutralized sludge sufficient to completely neutralize the remaining acid constituents in the sludge, removing the resulting water solution of sulphate salts to leave a residual neutralized sludge substantially free from mineral acid salts, and emulsifying the residual neutralized sludge with a water solution of an alkali base in sufficient quantities to form the color coat.

2. A process of forming a color coat to color and render cemented surfaces waterproof, comprising, commingling water at a temperature of approximately 212 degrees F. with an acid sludge derived from an acid treatment of an asphalt base lubricating oil stock with sulphuric acid, adding and mixing a water solution of an alkali base with the mixture of water and acid sludge in quantities sufficient to neutralize a portion of the acid constituents present, removing the resulting water solution of sulphate salts, then adding and mixing a further quantity of the water solution of the alkali base with the partly neutralized sludge sufficient to completely neutralize the remaining acid constituents in the sludge, removing the resulting water solution of sulphate salts to leave a residual neutralized sludge substantially free from mineral acid salts, and emulsifying the residual neutralized sludge with a water solution of an alkali base in sufficient quantities to form the color coat.

3. A process of forming a color coat to color and render cemented surfaces waterproof, comprising, commingling water with an acid sludge derived from an acid treatment of an asphalt base lubricating oil stock with sulphuric acid, adding and commingling a water solution of an alkali base with the mixture of water and acid sludge in quantities sufficient to neutralize a portion of the acid constituents present, removing the resultant water soluble constituents, then adding and mixing a further quantity of the water solution of the alkali base with the partly neutralized sludge to neutralize another portion of the acid constituents in the sludge and removing the resulting water soluble constituents, continuing the addition and mixing of the water solution of the alkali base with the sludge and removal of water soluble constituents until a residual neutralized sludge is obtained substantially free from mineral acid salts, and then emulsifying the residual sludge with a water solution of an alkali base in sufficient quantities to form the color coat of a required fluidity.

4. A process of forming a color coat, comprising, treating a commingled mixture of water and acid sludge, the sludge acid having been derived from a sulphuric acid treatment of an asphalt base lubricating oil stock, with a water solution of an alkali base in steps, and removing the water soluble constituents after each step until a neutral sludge is obtained substantially free from mineral acid salts, and then emulsifying the neutral sludge with a water solution of an alkali base in sufficient quantities to form the color coat.

In testimony whereof I affix my signature.

WIRT D. RIAL.